US010070293B2

(12) United States Patent
Lu et al.

(10) Patent No.: US 10,070,293 B2
(45) Date of Patent: Sep. 4, 2018

(54) METHOD FOR IMPLEMENTING BLUETOOTH AUTOMATIC RETURN LINK IN ANDROID SYSTEM (71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 0 days.

(21) Appl. No.: 15/834,018

(22) Filed: Dec. 6, 2017

(65) Prior Publication Data

US 2018/0103338 A1 Apr. 12, 2018

Related U.S. Application Data

(63) Continuation of application No. PCT/CN2016/084568, filed on Jun. 2, 2016.

(30) Foreign Application Priority Data

Jun. 26, 2015 (CN) .......................... 2015 1 0363981

(51) Int. Cl.
*H04W 4/00* (2018.01)
*H04W 8/00* (2009.01)
(Continued)

(52) U.S. Cl.
CPC .............. *H04W 4/80* (2018.02); *H04W 4/00* (2013.01); *H04W 8/005* (2013.01); *H04W 76/10* (2018.02)

(58) Field of Classification Search
USPC ...................................................... 455/41.2
See application file for complete search history.

(56) References Cited

U.S. PATENT DOCUMENTS 8,880,122 B2 * 11/2014 George ................. H04W 8/005
370/338
9,787,393 B2 * 10/2017 Lu ........................... H04W 4/00
(Continued)

FOREIGN PATENT DOCUMENTS

CN 101635586 A 1/2010
CN 101835279 A 9/2010
(Continued)

OTHER PUBLICATIONS

International Search Report of corresponding International PCT Application No. PCT/CN2016/084568, dated Aug. 12, 2016.
(Continued)

*Primary Examiner* — Nay A Maung
*Assistant Examiner* — Erica Fleming-Hall
(74) *Attorney, Agent, or Firm* — J.C. Patents (57) ABSTRACT

The present invention provides a method for implementing Bluetooth automatic return link in Android system, which belongs to wireless communication field. The method includes: in a case that the a Bluetooth module is activated, when a mobile terminal detects that Bluetooth broadcast is a Bluetooth connecting request, executing steps of: determining whether a Bluetooth device address contained in the Bluetooth connecting request matches a Bluetooth device address in buffer, if yes, building connection with a current Bluetooth device corresponding to the Bluetooth device address contained in the Bluetooth connecting request, and updating Bluetooth connection state to connected state; otherwise, not responding to the Bluetooth connecting request. By a mechanism of Bluetooth automatic return link provided by the present invention, trouble of manually reconnecting after restarting a Bluetooth peripheral is reduced, which makes operations smarter and simpler and improves easy-using of the product and user experience.

12 Claims, 2 Drawing Sheets

(51) Int. Cl.
*H04W 4/80* (2018.01)
*H04W 76/10* (2018.01)

(56) References Cited

U.S. PATENT DOCUMENTS

| | | | | |
|---|---|---|---|---|
| 2003/0056098 | A1* | 3/2003 | Aihara | H04L 63/083 |
| | | | | 713/168 |
| 2009/0061946 | A1* | 3/2009 | George | H04W 8/005 |
| | | | | 455/566 |
| 2012/0239742 | A1* | 9/2012 | Moradi | H04W 4/21 |
| | | | | 709/204 |
| 2015/0237661 | A1* | 8/2015 | Farrell | H04L 67/12 |
| | | | | 455/41.2 |
| 2015/0256546 | A1* | 9/2015 | Zhu | H04W 12/08 |
| | | | | 726/4 |
| 2016/0095037 | A1* | 3/2016 | Morita | H04W 12/06 |
| | | | | 370/331 |
| 2017/0142767 | A1* | 5/2017 | Furubayashi | H04W 76/14 |
| 2017/0290077 | A1* | 10/2017 | Nilsson | H04L 67/12 |

FOREIGN PATENT DOCUMENTS

| | | |
|---|---|---|
| CN | 102545965 A | 7/2012 |
| CN | 103179635 A | 6/2013 |
| CN | 104540091 A | 4/2015 |
| CN | 104967971 A | 10/2015 |
| KR | 10-2008-0088886 | 10/2008 |

OTHER PUBLICATIONS

The Chinese First Examination Report of corresponding China patent application No. 201510363981.0, dated Dec. 11, 2017.

* cited by examiner

METHOD FOR IMPLEMENTING BLUETOOTH AUTOMATIC RETURN LINK IN ANDROID SYSTEM

CROSS-REFERENCE TO RELATED APPLICATIONS

This application is a continuation of International Application No. PCT/CN2016/084568, filed on Jun. 2, 2016, which claims priority to Chinese Patent Application No. 201510363981.0, filed on Jun. 26, 2015, entitled "METHOD FOR IMPLEMENTING BLUETOOTH AUTOMATIC RETURN LINK IN ANDROID SYSTEM", both of which are hereby incorporated by reference in their entireties.

FIELD OF THE INVENTION

The present invention relates to wireless communication field, more particularly, to a method for implementing Bluetooth automatic return link in an Android system.

BACKGROUND OF THE INVENTION

In the prior art, the Bluetooth function has become a standard function of a mobile terminal such as a smart phone. Therefore all kinds of Bluetooth devices communicating with the mobile terminal are emerging in an endless stream, for example, Bluetooth keys. At present, a communication process between a mobile terminal with an Android system and a Bluetooth device is about as the following. The Bluetooth device activates; a user operates the mobile terminal manually to make the mobile terminal with the Android system and the activated Bluetooth device build connection; when the Bluetooth device is shut off, the mobile terminal with the Android system will disconnect the Bluetooth connection with the Bluetooth device; when the Bluetooth device reactivates, a Bluetooth module inside the mobile terminal with the Android system will not connect the Bluetooth device actively, it requires the user to reconnect the Bluetooth device manually, which adds unnecessary operations and leads to bad user experience to the user.

SUMMARY OF THE INVENTION

In order to solve technical defects in the prior art, the present invention provides a method for implementing Bluetooth automatic return link in an Android system.

A technical solution provided by the present invention is as the following.

A method for implementing Bluetooth automatic return link in an Android system, includes:

initializing, by a mobile terminal, a Bluetooth connection state as an unconnected state, registering Bluetooth monitoring broadcast, setting monitoring a button event, in a case that a Bluetooth module is activated, when the button event detected by the mobile terminal is a connecting Bluetooth event, executing Step A1 to Step A3 orderly or executing Step A2, Step A1 and Step A3 orderly;

Step A1, searching, by the mobile terminal, a Bluetooth device list, obtaining a Bluetooth device address of a current Bluetooth device selected by a user, and completing pairing with the current Bluetooth device according to the Bluetooth device address;

Step A2, determining, by the mobile terminal, whether the Bluetooth connection state is a connected state, if yes, disconnecting a Bluetooth device corresponding to a Bluetooth device address in a buffer and updating the Bluetooth connection state to the unconnected state, then executing a next step; otherwise, executing the next step directly;

Step A3, building, by the mobile terminal, connection with the current Bluetooth device, updating the Bluetooth connection state to the connected state, storing the Bluetooth device address of the current Bluetooth device in the buffer, sending terminal information to the current Bluetooth device;

the above Step A1 specifically is: creating an activity window; displaying the Bluetooth device list, in which Bluetooth devices paired with the mobile terminal previously, in the activity window; obtaining a trigger operation on the activity window from the user, and obtaining, according to the trigger operation, a name and an address of the current Bluetooth device that is selected by the user to be connected; checking whether the current Bluetooth device has paired with the mobile terminal, if yes, executing a next step, otherwise, executing the next step after completing pairing with the current Bluetooth device.

When a Bluetooth broadcast detected by the mobile terminal is a Bluetooth connecting request, executing Step B1 to Step B3 orderly or executing Step B2, Step B1 and Step B3 orderly;

Step B1, determining, by the mobile terminal, whether a Bluetooth device address contained in the Bluetooth connecting request matches a Bluetooth device address in the buffer, if yes, executing a next step; otherwise, not responding to the Bluetooth connecting request;

Step B2, determining, by the mobile terminal, whether the Bluetooth connection state is the unconnected state, if yes, executing a next Step; otherwise, not responding to the Bluetooth connecting request;

Step B3, building, by the mobile terminal, connection with a Bluetooth device corresponding to the Bluetooth device address contained in the Bluetooth connecting request and updating the Bluetooth connection state to the connected state.

The method provided by the present invention further includes: when the Bluetooth broadcast detected by the mobile terminal is a disconnecting request, executing steps of: determining whether a Bluetooth device address contained in the disconnecting request matches the Bluetooth device address in the buffer, if yes, disconnecting a Bluetooth device corresponding to the Bluetooth device address contained in the disconnecting request, and updating the Bluetooth connection state to the unconnected state; otherwise, not responding to the disconnecting request.

The method further includes: determining whether a receiving method of a Bluetooth broadcast receiving object in the registered Bluetooth monitoring broadcast is invoked, if yes, invoking a first preset method and determining a type of the Bluetooth broadcast according to a return value obtained by invoking the first preset method, the type of the Bluetooth broadcast includes a Bluetooth connecting request and a disconnecting request.

The method further includes: determining, by the mobile terminal, whether a second preset method in a button event which represents connecting Bluetooth device button is invoked, if yes, determining that the detected button event is the connecting Bluetooth event, otherwise, determining that the connecting Bluetooth event is not detected.

The method further includes: when the Bluetooth module is not activated, prompting, by the mobile terminal, to activate the Bluetooth module; when the button event detected by the mobile terminal is an activating Bluetooth event, activating the Bluetooth module. Activating the Bluetooth module specifically includes: creating an activating event for requesting Bluetooth activation, invoking a preset callback function to determine whether activating Bluetooth module is successful, if yes, determining that the Bluetooth module is activated; otherwise, ending.

In the method provided by the present invention, determining, by the mobile terminal, whether the Bluetooth connection state is the connected state specifically includes: determining, by the mobile terminal, whether an identification of the Bluetooth connection state is a preset value, if yes, determining that the Bluetooth connection state is the connected state; otherwise, determining that the Bluetooth connection state is the unconnected state.

The above Step A3 and Step B3 further include: communicating, by the mobile terminal, with the connected current Bluetooth device, disconnecting the current Bluetooth device after communication is ended and updating the Bluetooth connection state to the unconnected state. Building connection with the current Bluetooth device specifically includes: creating a Bluetooth connection sub-thread; after creating the Bluetooth connection sub-thread, the method further includes: creating a Bluetooth communication sub-thread, disconnecting the current Bluetooth device specifically includes: canceling the Bluetooth connection sub-thread and the Bluetooth communication sub-thread.

The advantages achieved by the technical solution above is as the following: by a mechanism of the Bluetooth automatic return link provided by the present invention, trouble of manually reconnecting after restarting a Bluetooth peripheral is reduced, which makes operations smarter and simpler and improves easy-using of the product and user experience.

DETAILED DESCRIPTION

In order to make objectives, technical solutions and advantages of the present invention clearer, embodiments of the present invention are described in more details in conjunction with the accompanying drawings as follows.

Embodiment 1

Embodiment 1 provides a method for implementing Bluetooth automatic return link in an Android system, which is applied in a mobile terminal with an Android operating system. The method provided by the present embodiment includes:

Initializing operation: the mobile terminal initializes a Bluetooth connection state as an unconnected state, registers Bluetooth monitoring broadcast and sets monitoring a button event.

Monitoring Operation:

1) determine whether a second preset method in a button event, which represents activating Bluetooth button, is invoked, if yes, determine that the detected button event is an activating Bluetooth event, otherwise, determine that the activating Bluetooth event is not detected.

2) determine whether a receiving method of a Bluetooth broadcast receiving object in the registered Bluetooth monitoring broadcast is invoked, if yes, invoke a first preset method and determine a type of the Bluetooth broadcast according to a return value obtained by invoking the first preset method, the type of the Bluetooth broadcast includes a Bluetooth connecting request and a disconnecting request.

3) determine whether a second preset method in a button event, which represents connecting Bluetooth device button, is invoked, if yes, determine that the detected button event is a connecting Bluetooth event; otherwise, determine that the connecting Bluetooth event is not detected.

Other Operations:

When detecting that the button event is the activating Bluetooth event, activate a Bluetooth module.

When detecting that the button event is the connecting Bluetooth event, execute Step A1 to Step A3 orderly:

Step A1, the mobile terminal searches a Bluetooth device list, obtains a Bluetooth device address of the current Bluetooth device selected by a user, and completes pairing with the current Bluetooth device according to the Bluetooth device address;

Step A2, the mobile terminal determines whether the Bluetooth connection state is a connected state, if yes, the mobile terminal disconnects the Bluetooth device corresponding to a Bluetooth device address in a buffer and updates the Bluetooth connection state to the unconnected state, then execute the next step; otherwise, execute the next step directly;

Specifically, that the mobile terminal determines whether the Bluetooth connection state is the connected state specifically includes that the mobile terminal determines whether an identification of the Bluetooth connection state is a preset value, if yes, determine that the Bluetooth connection state is the connected state; otherwise, determine that the Bluetooth connection state is the unconnected state.

Step A3, the mobile terminal builds connection with the current Bluetooth device, modifies the Bluetooth connection state to the connected state, stores the Bluetooth device address of the current Bluetooth device in the buffer and sends terminal information to the current Bluetooth device.

Further, the execution sequence of Step A1 and Step A2 can be exchanged.

Figure 1:
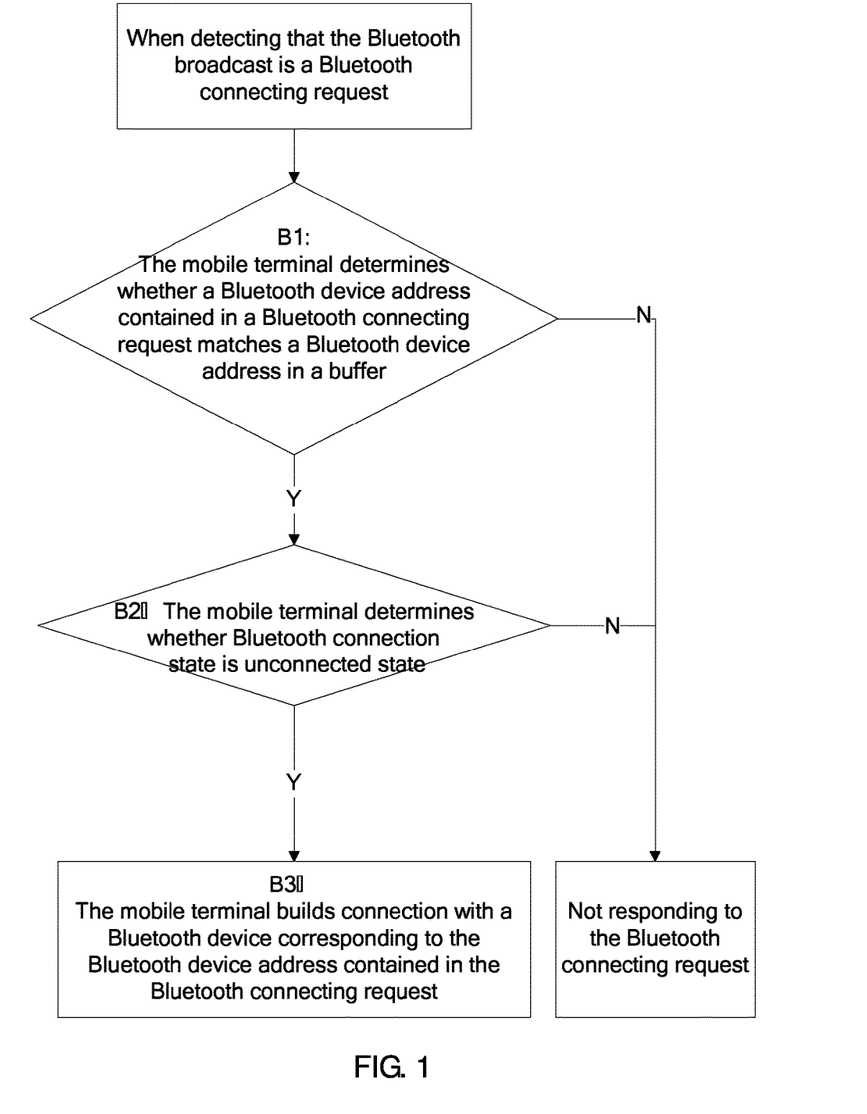
FIG. 1 is a flowchart of operating when detecting that a Bluetooth broadcast is a Bluetooth connecting request provided by Embodiment 1 of the present invention.

FIG. 1 is a flowchart of operating when detecting that a Bluetooth broadcast is a Bluetooth connecting request provided by Embodiment 1 of the present invention. When detecting that the Bluetooth broadcast is the Bluetooth connecting request, Step B1 to Step B3 are executed orderly, as shown in FIG. 1:

Step B1, the mobile terminal determines whether the Bluetooth device address contained in the Bluetooth connecting request matches a Bluetooth device address in the buffer, if yes, execute the next step; otherwise, do not respond to the Bluetooth connecting request;

Step B2, the mobile terminal determines whether the Bluetooth connection state is the unconnected state, if yes, execute the next step; otherwise, do not respond to the Bluetooth connecting request;

Step B3, the mobile terminal builds connection with the Bluetooth device corresponding to the Bluetooth device address contained in the Bluetooth connecting request and updates the Bluetooth connection state to the connected state.

Further, the execution sequence of Step B1 and Step B2 can be exchanged.

When detecting that the Bluetooth broadcast is a disconnecting request, executing following steps: determine whether the Bluetooth device address contained in the disconnecting request matches the Bluetooth device address in the buffer, if yes, disconnect the Bluetooth device corresponding to the Bluetooth device address contained in the disconnecting request and update the Bluetooth connection state to the unconnected state; otherwise, do not respond to the disconnecting request.

After Step A3 and Step B3, the method further includes that the mobile terminal communicates with the current Bluetooth device with which the mobile terminal builds connection, disconnects the current Bluetooth device after communication is ended and updates the Bluetooth connection state to the unconnected state.

Embodiment 2

Figure 2:
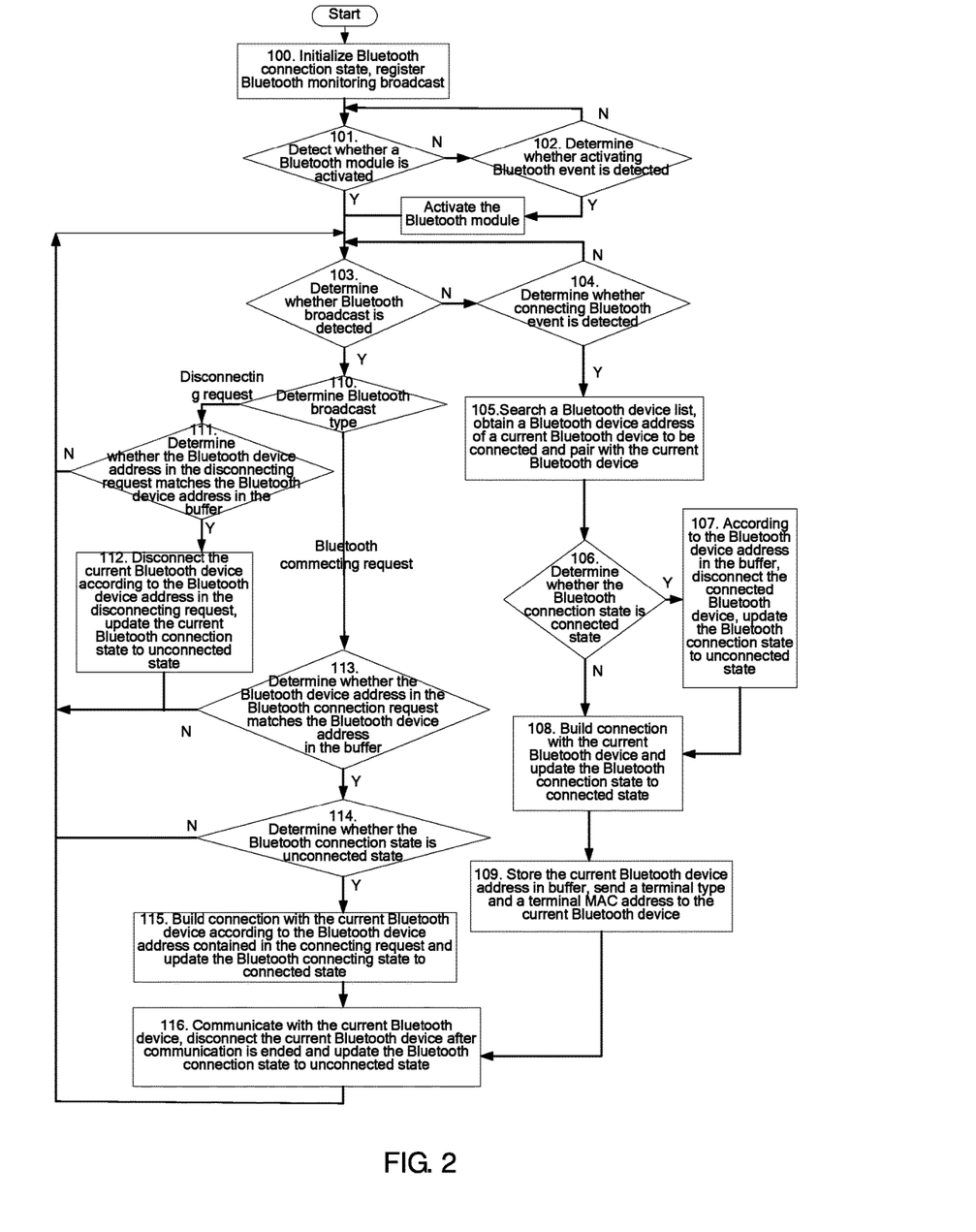
FIG. 2 is a flowchart of a method for implementing Bluetooth automatic return link in an Android system provided by Embodiment 2 of the present invention.

An embodiment of the present invention provides a method for implementing Bluetooth automatic return link in an Android system, which is applied in a mobile terminal with an Android operating system. By installing an application on the mobile terminal and taking Bluetooth connection between the mobile terminal with the Android operating system (such as an Android phone) and a Bluetooth device (such as a Bluetooth key) as an application scenario in the present embodiment, the method of the present invention is illustrated in details. The mobile terminal includes a Bluetooth module configured to perform Bluetooth communication with the Bluetooth device. FIG. 2 is a flowchart of a method for implementing Bluetooth automatic return link in an Android system provided by Embodiment 2 of the present invention. As shown in FIG. 2, when the application installed on the mobile terminal begins running, following steps are executed.

Step 100, initialize the Bluetooth connection state, register the Bluetooth monitoring broadcast.

Specifically, initialize the Bluetooth connection state as the unconnected state;

Register the Bluetooth monitoring broadcast according to context (mContext) of the application (mContext.registerReceiver(broadcastReceiver, intentFilter); in this case, broadcastReceiver is an implementation of a defined Bluetooth broadcast receiving class; intentFilter is an implementation of an event activating class).

For example, the implementation of registering Bluetooth monitoring broadcast is specifically as the following:

```
IntentFilter intentFilter = new IntentFilter( );
    //intentFilter.setPriority(2147483647);
    intentFilter.setPriority(1000);
intentFilter.addAction("android.bluetooth.device.action.PAIRING_REQUEST");
intentFilter.addAction(BluetoothDevice.ACTION_BOND_STATE_CHANGED);
    intentFilter.addAction(BluetoothDevice.ACTION_ACL_CONNECTED);
    intentFilter.addAction(BluetoothDevice.ACTION_ACL_DISCONNECT_REQUESTED);
    intentFilter.addAction(BluetoothDevice.ACTION_ACL_DISCONNECTED);
    intentFilter.addAction(Intent.ACTION_HEADSET_PLUG); // for audio
    mContext.registerReceiver(broadcastReceiver, intentFilter);
```

In this case, the implementation of the Bluetooth broadcast receiving class is specifically as the following:

```
broadcastReceiver = new BroadcastReceiver( ) {
        @Override
        public void onReceive(Context context, Intent intent) {
        ......
    }
    } .
```

Step 101, detect whether the Bluetooth module is activated, if yes, execute Step 103; otherwise, execute Step 102;

Specifically, invoke a system interface function BluetoothAdapter.getDefaultAdapter( ).isEnabled( ) determine whether the return value of invoking this function is true, if yes, the Bluetooth module is activated; otherwise, the Bluetooth module is not activated.

Further, if the Bluetooth is not activated, prompt to activate the Bluetooth and wait for a user to activate the Bluetooth module.

Step 102, determine whether the activating Bluetooth event is detected, if yes, activate the Bluetooth module, then execute Step 103; otherwise, go back to Step 101;

Specifically, the activating Bluetooth event is monitored via the button event which represents activating Bluetooth button in a UI (user operating interface) layer, i.e. BtnBlueOpen.setOnClickListener.

For example, the set button event which represents activating Bluetooth button is as the following:

```
BtnBlueOpen.setOnClickListener(new OnClickListener( ) {
        @Override
        public void onClick(View v) {
            // TODO Auto-generated method stub
        }
    });
```

Specifically, this step includes: determining whether the method onClick(View v) is overloaded, if yes, which represents that the activating Bluetooth event is detected, activating the Bluetooth module, then executing Step 103; otherwise, which represents that the activating Bluetooth event is not detected, going back to Step 101.

In the present embodiment, activating the Bluetooth module specifically includes: creating an activating event for requesting Bluetooth activation, determining whether activating Bluetooth module is successful by invoking a callback function, if the activating is successful, continuing to execute Step 103, if the activating fails, ending the procedure.

Creating the activating event for requesting Bluetooth activation is specifically implemented by:
   Intent intent=new Intent(BluetoothAdapter.ACTION_REQUEST_ENABLE); startActivityForResult(intent, CODE_TURN_ON_BT).

In this case, intent is an event activating object of the Android system, the function startActivityForResult is an interface function for sending back a request to the Android system, CODE_TURN_ON_BT is a request symbol which represents requesting to the Android system;

Determining whether activating Bluetooth module is successful by invoking the callback function specifically includes: overloading a function onActivityResult(int requestCode, int resultCode, Intent data) of Activity, determining a return value resultCode obtained by overloading this function, if resultCode==Activity.RESULT_OK, activating Bluetooth module is successful; if resultCode==Activity.RESULT_CANCELED, which represents that the user cancels the operation of activating Android system Bluetooth, activating Bluetooth module fails. The detailed program is implemented as the following:

```
@Override
public void onActivityResult(int requestCode, int resultCode, Intent data) {
    super.onActivityResult(requestCode, resultCode, data);
    if (requestCode == CODE_TURN_ON_BT) {
        if (resultCode == Activity.RESULT_OK) {
            // activating Bluetooth is successful
            .......
        }else if (resultCode == Activity.RESULT_CANCELED){
            // activating Bluetooth is canceled
            ........
        }
    }
}
```

Step 103, determine whether the Bluetooth broadcast is detected, if yes, execute Step 110; otherwise, execute Step 104;

Specifically, determine whether a function onReceive (Context context, Intent intent) of the Bluetooth broadcast receiving class broadcastReceiver is invoked, if yes, which represents that the Bluetooth broadcast is received, execute Step 110; otherwise, which represents that the Bluetooth broadcast is not received, execute Step 104.

Step 104, determine whether the connecting Bluetooth event is detected, if yes, execute Step 105; otherwise, go back to Step 103;

Specifically, the connecting Bluetooth event BtnBlueConnect.setOnClickListener is monitored via the button event which represents connecting Bluetooth device button in the UI (user interface) layer.

For example, the set button event which represents connecting Bluetooth device button is as the following:

```
BtnBlueConnect.setOnClickListener(new OnClickListener( ) {
    @Override
    public void onClick(View v) {
        // TODO Auto-generated method stub
    }
});
```

This step specifically includes: determining whether the method onClick(View v) is overloaded, if yes, which represents that the connecting Bluetooth event is detected, executing Step 105; otherwise, which represents that the connecting Bluetooth event is not detected, executing Step 103.

Step 105, search a Bluetooth device list, obtain a Bluetooth device address of a current Bluetooth device to be connected and pair with the current Bluetooth device;

Specifically, an Activity for searching the Bluetooth device list is created and a list of the Bluetooth devices that paired with the mobile terminal previously is displayed in the Activity of the Bluetooth device list. At the same time, the user is prompted to click a search button and the Bluetooth device to be connected currently is selected by clicking of the user; after the user selects the Bluetooth device to be connected, the system can obtain a name of currently selected Bluetooth device and an address of the Bluetooth device, for example, macAddr: 00:11:22:AA:BB:CC; by obtaining the address of the Bluetooth device, whether the currently selected Bluetooth device and the mobile terminal are paired is determined, if yes, go to the next step directly; otherwise, go to a pairing step.

Checking whether the currently selected Bluetooth device and the mobile terminal are paired, if yes, going to Step 106; otherwise going to the pairing step; the pairing step specifically includes:

1.1 invoke an Android system interface BluetoothAdapter to obtain the currently displayed Bluetooth device list;

1.2 invoke a function btAdapter.getRemoteDevice (macAddr) to obtain an object device of a class BluetoothDevice; in this case, macAddr is a Bluetooth device address of the Bluetooth device which is selected by the user to be connected;

1.3 invoke a method device.getBondState( ) of the class to determine whether the currently selected Bluetooth device has paired with the Android system, if device.getBondState( )!=BluetoothDevice.BOND_BONDED, which represents that the currently selected Bluetooth device has not paired with the mobile terminal before, execute Step 1.4; otherwise, which represents that the currently selected Bluetooth device has paired with the mobile terminal before, execute Step 106 directly;

1.4 pair with the currently selected Bluetooth device and determine whether pairing is successful, if yes, execute Step 106; otherwise, end the procedure.

Preferably, the detailed program for implementing Steps 1.1-1.4 is:

```
BluetoothAdapter btAdapter = BluetoothAdapter.getDefaultAdapter( );
final BluetoothDevice device = btAdapter.getRemoteDevice(macAddr);
Boolean returnValue = false;
 if (device.getBondState( ) != BluetoothDevice.BOND_BONDED){
Method createBondMethod = btClass.getMethod("createBond");
returnValue = (Boolean) createBondMethod.invoke(btDevice);
}
If (returnValue){
// it represents successful pairing with the Bluetooth device
}else{
// it represents failed pairing with the Bluetooth device
}
```

Step 106, determine whether the Bluetooth connection state is the connected state, if yes, execute Step 107; otherwise, execute Step 108;

Specifically, determining whether the identification of the Bluetooth connection state connected (boolean type of java) is true, if yes, which represents connected, execute Step 107; otherwise, which represents unconnected, execute Step 108.

Further, the sequence of Step 105 and Step 106 can be exchanged, i.e. Step 106 of determining whether the Bluetooth connection state is the connected state is executed firstly, if yes, execute Step 105 after executing Step 107; otherwise, execute Step 105 directly and execute Step 108 after executing Step 105.

Step 107, disconnect, according to the Bluetooth device address in the buffer, the connected Bluetooth device, update the Bluetooth connection state to the unconnected state, then execute Step 108;

Specifically, disconnect the current Bluetooth device, reset the Bluetooth connection state to the unconnected state and cancel a Bluetooth connection sub-thread and a Bluetooth communication sub-thread Specifically, the implementation is as the following:

```
If(mConnectThread != null){
   mConnectThread.interrupt( );
       mConnectThread.cancel( );
       mConnectThread = null;
}
if (mSendRecv != null) {
   mSendRecv.cancel( );
   mSendRecv = null;
}
```

In this case, mConnectThread is the Bluetooth connection sub-thread, mSendRecv is the Bluetooth communication sub-thread.

Step 108, build connection with the current Bluetooth device and update the Bluetooth connection state to the connected state;

Specifically, create the Bluetooth connection sub-thread of the paired Bluetooth device and create the Bluetooth communication sub-thread; if the sub-threads are created successfully, update a master UI thread by Handler transferred in to show that the terminal connects with the Bluetooth device successfully.

Create the Bluetooth connection sub-thread for connecting the Bluetooth device, then create the Bluetooth communication sub-thread after successfully creating the Bluetooth connection sub-thread, which is implemented specifically as the following:

```
synchronized void connect(BluetoothDevice device) {
   currentDevice = device;
   try{
   // Cancel any thread attempting to make a connection
   if (mState == STATE_CONNECTING) {
      if (mConnectThread != null) {
         mConnectThread.cancel( );
         mConnectThread = null;
      }
   }
   // Cancel any thread currently running a connection
   if (mSendRecv != null) {
      mSendRecv.cancel( );
      mSendRecv = null;
   }
   // Start the thread to connect with the given device
   mConnectThread = new ConnectThread(device);
   mConnectThread.start( );
   setState(STATE_CONNECTING);
   }catch(Exception e){
      e.printStackTrace( );
   }
}
synchronized void connected(BluetoothSocket socket,
      BluetoothDevice device) {
   // Cancel the thread that completed the connection
   if (mConnectThread != null) {
      mConnectThread.cancel( );
      mConnectThread = null;
   }
   // Cancel any thread currently running a connection
   if (mSendRecv != null) {
      mSendRecv.cancel( );
      mSendRecv = null;
   }
   mSendRecv = new SendRecv(socket);
   setState(STATE_CONNECTED);
```

-continued

```
if(token!=null){
   SystemClock.sleep(100);
   if(token.isBtKeyAvailable( )){
      connectionSuccess( );
   }else{
      if(current_reconnect_time++ <= RECONNECT_TIMES){
         token.reInit( );
      }else{
         connectionFailed( );
      }
   return;
   }
  }
}
```

In this case, connect is the Bluetooth connection sub-thread, connected is the Bluetooth communication sub-thread.

Step 109, store the current Bluetooth device address in the buffer, send a terminal type and a terminal MAC address to the current Bluetooth device, then execute Step 116;

Specifically, after successfully connecting with the Bluetooth device, the terminal application will buffer the name of the current Bluetooth device and the Bluetooth device address to local by SharedPreferences, then the terminal application will send a terminal manufacture of the terminal Android system, the terminal type and the terminal MAC address to the current Bluetooth device, in such way, it is convenient for the connected Bluetooth device to remember the connected terminal device, and the Bluetooth device will send a connecting request to the remembered mobile terminal with which the Bluetooth device connected last time as a priority when the Bluetooth device restarts.

Further, storing the current Bluetooth device address in the buffer specifically includes: if there is no Bluetooth device address in the buffer, buffer the current Bluetooth device address, if there is a Bluetooth device address in the buffer, cover the existed Bluetooth device address in the buffer with the current Bluetooth device address.

Step 110, determine the Bluetooth broadcast type, if the Bluetooth broadcast type is the Bluetooth connecting request, execute Step 113, if the Bluetooth broadcast type is the disconnecting request, execute Step 111;

Specifically, when receiving the Bluetooth broadcast, a method intent.getAction( ) is invoked; the Bluetooth broadcast type is determined according to a character string String returned by invoking the method, if the returned character string String is BluetoothDevice.ACTION_ACL_DISCONNECTED, the Bluetooth broadcast type is the disconnecting request; if the returned character string String is BluetoothDevice.ACTION_ACL_CONNECTED, the Bluetooth broadcast type is the Bluetooth connecting request.

Step 111, determine whether the Bluetooth device address in the disconnecting request matches the Bluetooth device address in the buffer, if yes, execute Step 112, otherwise, go back to Step 103;

Specifically, the buffered Bluetooth device address is the device address of the currently connected Bluetooth device, determining whether the Bluetooth device address in the disconnecting request matches the address of the currently connected Bluetooth device is specifically implemented by device.getAddress( ).equalsIgnoreCase(tm.getBTDeviceAddr( ); in this case, device.getAddress( ) is the Bluetooth device address in the disconnecting request, tm.getBTDeviceAddr( ) is the address of the currently connected Bluetooth device.

Step 112, disconnect the current Bluetooth device according to the Bluetooth device address in the disconnecting request, update the current Bluetooth connection state to the unconnected state, then go back to Step 103;

Specifically, the connection with the current Bluetooth device is disconnected, the Bluetooth connection state is reset to the unconnected state and the Bluetooth connection sub-thread and the Bluetooth communication sub-thread are canceled.

Specifically, the implementation is as the following:

```
If(mConnectThread != null){
mConnectThread.interrupt( );
        mConnectThread.cancel( );
        mConnectThread = null;
}
if (mSendRecv != null){
  mSendRecv.cancel( );
  mSendRecv = null;
}
```

In this case, mConnectThread is the Bluetooth connection sub-thread, mSendRecv is the Bluetooth communication sub-thread.

Step 113, determine whether the Bluetooth device address in the Bluetooth connecting request matches the Bluetooth device address in the buffer, if yes, execute Step 114; otherwise, go back to execute Step 103;

Further, before executing this step, the method further includes: determining whether there is a Bluetooth device address in the buffer, if yes, executing Step 113; otherwise, going back to Step 103.

Step 114, determine whether the Bluetooth connection state is the unconnected state, if yes, execute Step 115; otherwise, go back to Step 103;

Further, the execution sequence of Step 114 and the Step 113 can be exchanged, i.e. firstly, Step 114 of determining whether the Bluetooth connection state is the unconnected state is executed, if yes, execute Step 113; otherwise, go back to execute Step 103; determine whether the Bluetooth device address in the connecting request matches the Bluetooth device address in the buffer, if yes, execute Step 115; otherwise, go back to Step 103.

Step 115, build connection with the current Bluetooth device according to the Bluetooth device address contained in the connecting request and update the Bluetooth connection state to the connected state;

Specifically, the Bluetooth connection sub-thread for the current Bluetooth device is created and the Bluetooth communication sub-thread is created; if the sub-threads are created successfully, update the master UI thread via Handler transferred in to show that the terminal connects with the Bluetooth device successfully. Specific program implementation is the same as Step 108, no more detail is given here.

Step 116, communicate with the current Bluetooth device, disconnect the current Bluetooth device after communication is ended and update the Bluetooth connection state to the unconnected state; then go back to Step 103.

Further, when the application stops running, the Bluetooth monitoring broadcast registered in Step 100 will be canceled.

What is described above is merely specific implementations of the present invention, but does not limit the protection scope of the present invention. Variations and substitutions that can be easily figured out by persons skilled in the art within the technical scope disclosed in the present invention shall all fall within the protection scope of the present invention. Therefore, the protection scope of the present invention is subject to the appended claims.

What is claimed is:

1. A method for implementing Bluetooth automatic return link in an Android system, comprises:
   initializing, by a mobile terminal, a Bluetooth connection state as an unconnected state, registering Bluetooth monitoring broadcast, setting monitoring a button event, in a case that a Bluetooth module is activated, when the button event detected by the mobile terminal is a connecting Bluetooth event, executing Step A1 to Step A3 orderly or executing Step A2, Step A1 and Step A3 orderly; when a Bluetooth broadcast detected by the mobile terminal is a Bluetooth connecting request, executing Step B1 to Step B3 orderly or executing Step B2, Step B1 and Step B3 orderly;
   Step A1, searching, by the mobile terminal, a Bluetooth device list, obtaining a Bluetooth device address of a current Bluetooth device selected by a user, and completing pairing with the current Bluetooth device according to the Bluetooth device address;
   Step A2, determining, by the mobile terminal, whether the Bluetooth connection state is a connected state, if yes, disconnecting a Bluetooth device corresponding to a Bluetooth device address in a buffer and updating the Bluetooth connection state to the unconnected state, then executing a next step; otherwise, executing the next step directly;
   Step A3, building, by the mobile terminal, connection with the current Bluetooth device, updating the Bluetooth connection state to the connected state, storing the Bluetooth device address of the current Bluetooth device in the buffer, sending terminal information to the current Bluetooth device;
   Step B1, determining, by the mobile terminal, whether a Bluetooth device address contained in the Bluetooth connecting request matches a Bluetooth device address in the buffer, if yes, executing a next step; otherwise, not responding to the Bluetooth connecting request;
   Step B2, determining, by the mobile terminal, whether the Bluetooth connection state is the unconnected state, if yes, executing a next Step; otherwise, not responding to the Bluetooth connecting request;
   Step B3, building, by the mobile terminal, connection with a Bluetooth device corresponding to the Bluetooth device address contained in the Bluetooth connecting request and updating the Bluetooth connection state to the connected state.

2. The method of claim 1, wherein the method further comprises: when the Bluetooth broadcast detected by the mobile terminal is a disconnecting request, executing steps of: determining whether a Bluetooth device address contained in the disconnecting request matches the Bluetooth device address in the buffer, if yes, disconnecting a Bluetooth device corresponding to the Bluetooth device address contained in the disconnecting request, and updating the Bluetooth connection state to the unconnected state; otherwise, not responding to the disconnecting request.

3. The method of claim 2, wherein after registering the Bluetooth monitoring broadcast, the method further comprises: determining whether a receiving method of a Bluetooth broadcast receiving object in the registered Bluetooth monitoring broadcast is invoked, if yes, invoking a first preset method and determining a type of the Bluetooth broadcast according to a return value obtained by invoking the first preset method, the type of the Bluetooth broadcast comprises a Bluetooth connecting request and a disconnecting request.

4. The method of claim 1, wherein after registering the Bluetooth monitoring broadcast, the method further comprises: determining whether a receiving method of a Bluetooth broadcast receiving object in the registered Bluetooth monitoring broadcast is invoked, if yes, invoking a first preset method and determining a type of the Bluetooth broadcast according to a return value obtained by invoking the first preset method, the type of the Bluetooth broadcast comprises a Bluetooth connecting request and a disconnecting request.

5. The method of claim 1, wherein the method further comprises: determining, by the mobile terminal, whether a second preset method in a button event which represents connecting Bluetooth device button is invoked, if yes, determining that the detected button event is the connecting Bluetooth event, otherwise, determining that the connecting Bluetooth event is not detected.

6. The method of claim 1, wherein the method further comprises: when the Bluetooth module is not activated, prompting, by the mobile terminal, to activate the Bluetooth module; when the button event detected by the mobile terminal is an activating Bluetooth event, activating the Bluetooth module.

7. The method of claim 6, wherein activating the Bluetooth module specifically comprises: creating an activating event for requesting Bluetooth activation, invoking a preset callback function to determine whether activating Bluetooth module is successful, if yes, determining that the Bluetooth module is activated; otherwise, ending.

8. The method of claim 1, wherein Step A1 specifically is: creating an activity window; displaying the Bluetooth device list, in which Bluetooth devices paired with the mobile terminal previously, in the activity window; obtaining a trigger operation on the activity window from the user, and obtaining, according to the trigger operation, a name and an address of the current Bluetooth device that is selected by the user to be connected; checking whether the current Bluetooth device has paired with the mobile terminal, if yes, executing a next step, otherwise, executing the next step after completing pairing with the current Bluetooth device.

9. The method of claim 1, wherein determining, by the mobile terminal, whether the Bluetooth connection state is the connected state specifically comprises: determining, by the mobile terminal, whether an identification of the Bluetooth connection state is a preset value, if yes, determining that the Bluetooth connection state is the connected state; otherwise, determining that the Bluetooth connection state is the unconnected state.

10. The method of claim 1, wherein Step A3 and Step B3 further comprise: communicating, by the mobile terminal, with the connected current Bluetooth device, disconnecting the current Bluetooth device after communication is ended and updating the Bluetooth connection state to the unconnected state.

11. The method of claim 10, wherein building connection with the current Bluetooth device specifically comprises: creating a Bluetooth connection sub-thread; after creating the Bluetooth connection sub-thread, the method further comprises: creating a Bluetooth communication sub-thread, disconnecting the current Bluetooth device specifically comprises: canceling the Bluetooth connection sub-thread and the Bluetooth communication sub-thread.

12. The method of claim 1, wherein before Step B1, the method further comprises: determining, by the mobile terminal, whether a Bluetooth device address is buffered in the buffer, if yes, executing Step B1, otherwise, not responding to the Bluetooth connecting request.

* * * * *